(12) United States Patent
Schaffhauser et al.

(10) Patent No.: US 11,988,597 B2
(45) Date of Patent: May 21, 2024

(54) CARTRIDGE COMPRISING A CHANNEL FOR A FLUID SAMPLE, AN ASSEMBLY COMPRISING THE CARTRIDGE AND A METHOD OF ALIGNING AN OPTICAL DEVICE WITH THE CHANNEL OF THE CARTRIDGE

(71) Applicant: RQMICRO AG, Schlieren (CH)

(72) Inventors: Daniel Schaffhauser, Hergiswil (CH); Laurent Dellmann, Birmensdorf (CH); Jonathan Perraudin, Zurich (CH); Julien Langouët, Aix-en-Provence (FR)

(73) Assignee: RQMicro AG, Schlieren (CH)

( * ) Notice: Subject to any disclaimer, the term of this patent is extended or adjusted under 35 U.S.C. 154(b) by 224 days.

(21) Appl. No.: 17/424,200

(22) PCT Filed: Jan. 31, 2019

(86) PCT No.: PCT/IB2019/050792
§ 371 (c)(1),
(2) Date: Jul. 20, 2021

(87) PCT Pub. No.: WO2020/157544
PCT Pub. Date: Aug. 6, 2020

(65) Prior Publication Data
US 2022/0107262 A1    Apr. 7, 2022

(51) Int. Cl.
*G01N 21/05* (2006.01)
*B01L 3/00* (2006.01)

(52) U.S. Cl.
CPC ........ *G01N 21/05* (2013.01); *B01L 3/502715* (2013.01); *B01L 2200/025* (2013.01); *B01L 2300/0609* (2013.01); *B01L 2300/0654* (2013.01); *B01L 2300/0663* (2013.01); *G01N 2201/02* (2013.01)

(58) Field of Classification Search
CPC .... B41J 2/175; B01L 3/00; B01L 3/02; G01N 21/03; G01N 21/05; B65D 2303/00; B65D 2583/00
USPC ................................................. 250/221, 239
See application file for complete search history.

(56) References Cited

U.S. PATENT DOCUMENTS

| 5,997,121 A | * | 12/1999 | Altfather | ............. | B41J 2/17566 347/7 |
| 6,460,962 B1 | * | 10/2002 | Dietl | .................... | B41J 2/17566 347/19 |
| 2005/0134850 A1 | | 6/2005 | Rezachek et al. | | |

(Continued)

OTHER PUBLICATIONS

International Search Report and Written Opinion for PCT/IB2019/050792 dated Oct. 1, 2019, 12 pages.

*Primary Examiner* — Tony Ko
(74) *Attorney, Agent, or Firm* — Blank Rome LLP

(57) ABSTRACT

According to the present invention there is provided a cartridge (1) comprising a channel (1a) along which a sample fluid can flow; one or more elements (3, 4) which are configured to manipulate light in a predefined manner, and wherein said one or more elements (3, 4) are located in a predefined position relative to the channel (1a). There is further provided an assembly which comprises said cartridge (1) and an optical device (5) which can emit light; and a method of aligning the optical device (5) over the channel (1a) of the cartridge (1) using said one or more elements (3, 4) so that when the optical device (5) emits light it will be incident on any sample fluid provided in the channel (1).

24 Claims, 3 Drawing Sheets

(56) References Cited

U.S. PATENT DOCUMENTS

2014/0264082 A1  9/2014  Ayliffe
2016/0161418 A1  6/2016  Yeo

\* cited by examiner

CARTRIDGE COMPRISING A CHANNEL FOR A FLUID SAMPLE, AN ASSEMBLY COMPRISING THE CARTRIDGE AND A METHOD OF ALIGNING AN OPTICAL DEVICE WITH THE CHANNEL OF THE CARTRIDGE

RELATED APPLICATION

This application is a national phase of PCT/IB2019/050792, filed on Jan. 31, 2019. The entire content of this application is hereby incorporated by reference.

FIELD OF THE INVENTION

The present invention concerns a cartridge which has a channel and one or more elements which are configured to manipulate light in a predefined manner, which are located in a predefined position relative to the channel. There is further provided an assembly which comprises a cartridge and an optical device; and a method of arranging the optical device with respect to the cartridge so that the optical device is aligned over the channel.

DESCRIPTION OF RELATED ART

Flow cytometers usually comprise an interrogation area which is typically a channel along which a sample will flow; and a laser which can emit a laser beam which is made incident on the sample flowing in the channel so that the sample can be analyzed. A critical requirement in flow cytometry is that the laser beam must be in alignment with the interrogation area (i.e. the laser beam must be incident on the interrogation area) otherwise the laser beam will fail to be incident on the sample in the interrogation area. Without proper alignment of the laser with the interrogation area, a sample passing through the interrogation area will not be properly illuminated by the laser beam emitted by the laser, resulting in a very weak optical response signal or worse still, no optical response signal at all; this ultimately results in failure to analyze the sample.

Typical dimensions of the interrogation area and spot size of the laser beam are between 10 and 100 micrometers; the small dimensions of the laser beam spot size and the interrogation area makes alignment of the laser beam with the interrogation area even more difficult. This necessitates the need for a method to accurately align the laser beam with the interrogation area.

When the interrogation area is provided in a replaceable cartridge this means that every time a new cartridge is provided in a flow cytometer, the laser beam must be aligned with the interrogation area; in other words the laser must be moved so that the laser beam which it emits is incident on the interrogation area (typically a channel) of the new cartridge. This necessitates the need for a quick, uncomplicated method for aligning the laser beam with the interrogation area.

Disadvantageously, existing methods for aligning the laser beam with the interrogation area, are complicated, and/or slow, and/or often fail to achieve accurate alignment. Furthermore, it follows that existing cartridges, and assemblies, are not designed to facilitate uncomplicated, and/or fast, and/or accurate alignment.

It is an aim of the present invention to mitigate at least some of the disadvantages associated with existing methods, cartridges, and assemblies.

BRIEF SUMMARY OF THE INVENTION

According to the invention, the aim of the present invention are achieved by means of a cartridge, assembly and/or method having the features recited in the independent claims; wherein the dependent claims recite optional features of preferred embodiments.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
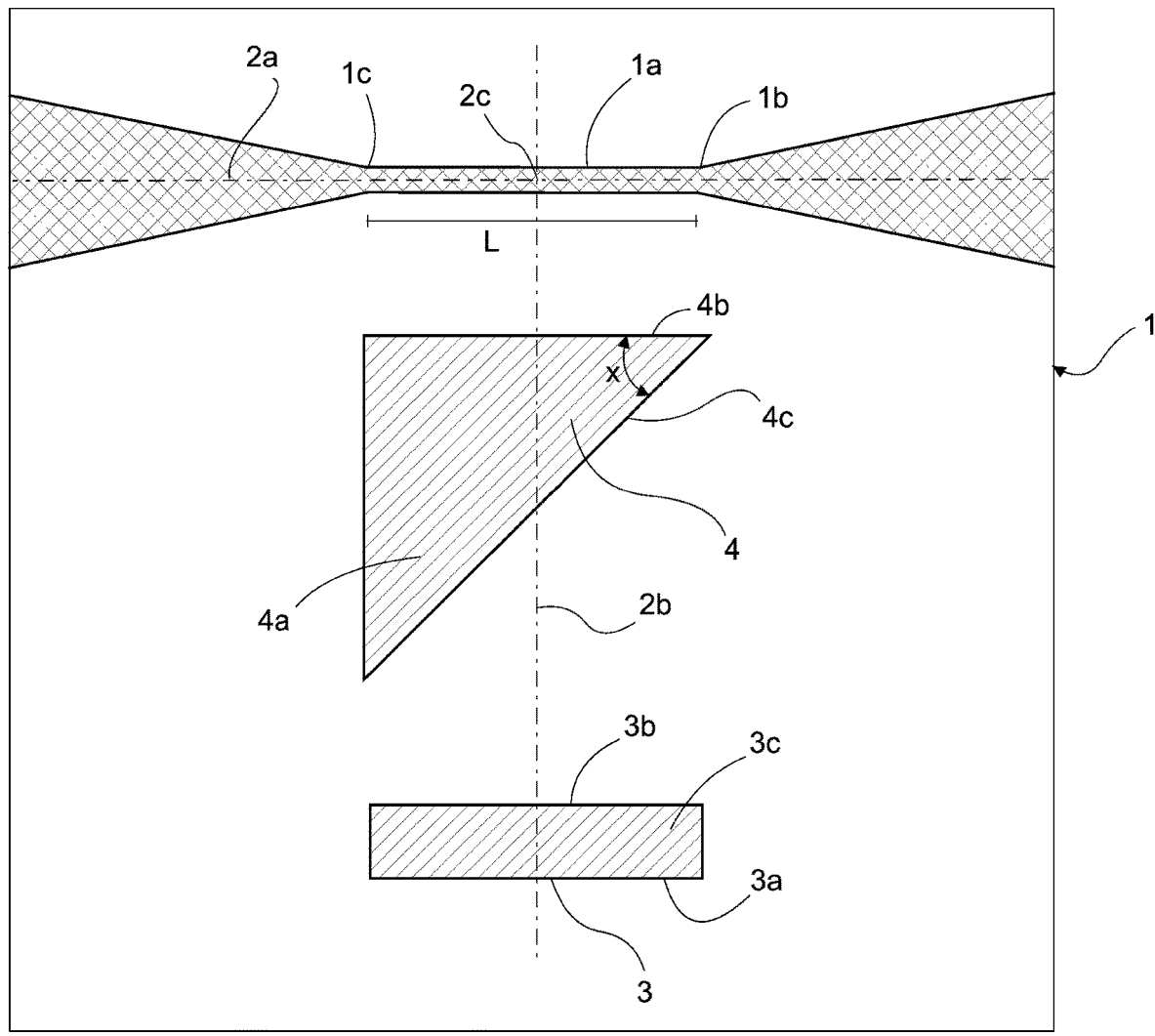
FIG. 1 shows a plan view of a cartridge according to an embodiment of the present invention.

FIG. 1 shows a plan view of a cartridge 1 according to an embodiment of the present invention. The cartridge 1 comprises, a channel 1a along which a sample fluid can flow; the channel has a length 'L' and it extends along an axis 2a, referred to hereafter as the channel axis 2a. The channel axis 2a extends along the middle of the channel 1a. The channel 1a has a start 1b and an end 1c; typically, when in use a sample will be made flow in a direction from the start 1b of the channel 1a, along the length L of the channel 1a, to the end 1c of the channel 1a.

The cartridge 1 further comprises one or more elements 3,4 which are configured to manipulate light in a predefined manner, and wherein said one or more elements 3,4 are located in a predefined position relative to the channel 1a. In this example the cartridge 1 comprises a first element 3 and a second element 4. The first element 3 is located at a predefined distance, along a second axis 2b which is perpendicular to the channel axis 2a, from the channel 1a. The intersection of the channel axis 2a and the second axis 2b, defines the centre 2c of the channel 1a. In this example the first element 3 is substantially cuboid shaped; specifically in this example the first element 3 is defined by a cuboid-shaped cavity 3. Thus, the first element 3 has a substantially rectangular-shaped surface 3c (which is the floor of the cuboid-shaped cavity 3) and this substantially rectangular-shaped surface 3c is configured to reflect light. It should be noted that the first element 3 may have any suitable shape; for example the first element 3 may have any arbitrary shape which has a portion (or a side 3a,3b), which is positioned opposite to the channel 1a and which is orientated parallel to the channel 1a.

The second element 4 is located at a predefined position along an axis which is parallel to the channel axis; in other words the second element 4 is located opposite to a predefined section of the channel axis 2a. In this example it can be seen from FIG. 1 that the second element 4 is located opposite to the channel 1a. In this example the second element 4 is substantially triangular-prism-shaped; specifically in this example the second element 4 is defined by a triangular-prism-shaped cavity 4. Thus the second element 4 has a substantially triangular-shaped surface 4a (which is the floor of the triangular-prism-shaped cavity 4) and this substantially triangular-shaped surface 4a is configured to reflect light.

As motioned the second element 4 is located opposite to the channel 1a. The second element 4 is orientated so that a first side 4b of the triangular-prism-shaped second element 4 is parallel to the channel axis 2a. A second side 4c of the of the triangular-prism-shaped second element 4 forms a predefined angle "x" with the first side 4b. Directly opposite to the start 1b of the channel 1a, the distance, along an axis parallel to the second axis 2b, between the first side 4b and the second side 4c, is known. Likewise, directly opposite to the end 1c of the channel 1a, the distance, along an axis parallel to the second axis 2b, between the first side 4b and the second side 4c, is known.

It should be understood that the cartridge 1 of the present invention is not limited to requiring both a first and second element 3,4; on the contrary in another embodiment the cartridge 1 may comprise only the first element 3 (i.e. no second element 4).

It should be understood that the first and second elements 3,4 may take any suitable shape; the present invention is not limited to requiring that the first element be cuboid-shaped and that the second element be triangular-prism-shaped. In a further variation the surface 4a of the triangular-prism-shaped second element 4 could be an equilateral triangular shape; an isosceles-triangular shape; or a right-angled triangular shape.

It should also be understood that said elements may be configured to manipulate light in any suitable manner, for example the elements could be configured to absorb light, reflect light, and/or scatter light; also in yet a further embodiment one or more of said elements may be configured to be auto-fluorescent.

Figure 2:
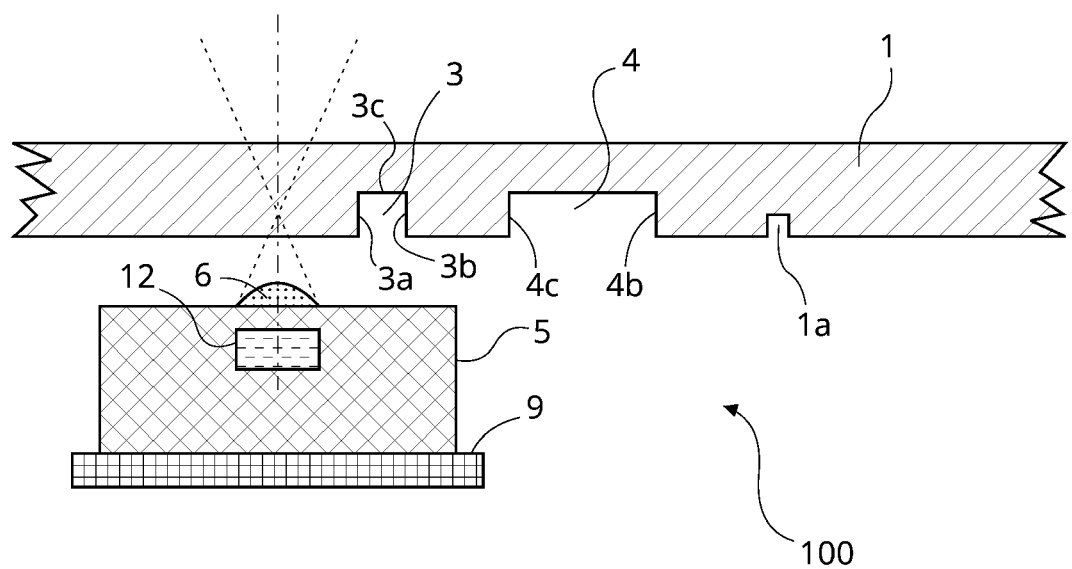
FIG. 2 shows a side view of an assembly according to an embodiment of the present invention.

FIG. 2 shows a side view of side view of an assembly 100 according to an embodiment of the present invention, which uses the cartridge 1 of FIG. 1.

The assembly 100 comprises the cartridge 1 as shown in FIG. 1, and an optical device 5 which is configured such that it can be selectively operated to emit a light (in the form of a light beam). The optical device 5 is arranged such that the emitted light beam will be incident on the cartridge 1. In this example the optical device 5 is arranged to emit light via a lens 6 which is provided in the optical device 5.

The assembly 100 further comprises a means for moving the optical device with respect to the cartridge, or a means for moving said cartridge with respect to the optical device. In this example the assembly 100 comprises a means for moving the optical device with respect to the cartridge, in the form of a carriage 9. The optical device 5 is mounted on the carriage 9, and the carriage can move so as to move the optical device with respect to the cartridge 1.

The assembly 100 further comprises a sensor 12 which can receive light from said cartridge 1 (said light having been originally emitted by said optical device 5 and having being reflected by the cartridge back to the sensor 12). The sensor 12 can output a signal which is representative of the light which it receives. In this example the sensor 12 is in the form of a photodiode 12; however it should be understood that the sensor 12 may take any suitable form.

The assembly 100 of FIG. 2 can be used to perform a method of arranging the optical device into a predefined position with respect to the cartridge, according to a further aspect of the present invention.

The method comprises the steps of,
operating the optical device 5 to emit light which is incident on the cartridge 1;
moving the optical device 5, from a starting position, over the cartridge 1 and over said first and second elements 3,4 on the cartridge (importantly it should be remembered that the first and second elements 3,4 have predefined positions relative to the channel 1);
as the optical device 5 is moved from said starting position, over the cartridge 1 and over said first and second elements 3,4 on the cartridge, recording the position of the optical device 5 relative to the starting position;
at each position for the optical device, detecting light using said sensor 12 and outputting from the sensor 12 a signal which represents light detected by the sensor 12, so as to provide an output signal which represents light detected by the sensor at each position of the optical device 5, and then
determining, from said output signal, the respective positions at which the optical device 5 was aligned over said first and second elements 3,4;
then determining how to move the optical device so that it is aligned above the channel 1a using said determined positions and the predefined position of said first and second elements 3,4 relative to the channel 1a; and then moving the optical device so that it is aligned above the channel 1a.

With regards to the step of then determining how to move the optical device so that it is aligned above the channel 1a, it should be understood that in some embodiments the method comprises determining how to move the optical device so that it is aligned above any point which is on the channel axis 2a, between the start 1b and the end 1c of the channel; and then moving the optical device 5 so that it is aligned above any point which is on the channel axis 2a, between the start 1b and the end 1c of the channel. For such embodiments the cartridge 1 needs only comprise the first element 3 (i.e. the second element 4 is not necessary; thus the second element 4 is not an essential element of the cartridge 1 because alignment of the optical device above any point which is on the channel axis 2a, between the start 1b and the end 1c of the channel, will allow for the laser beam emitted by the optical device with the channel 1a to be incident on any sample under test, which flows in the channel).

In other embodiments the method comprises determining how to move the optical device so that it is aligned above a point which is on the channel axis 2a, and is equal distance between the start 1b and the end 1c of the channel (in this case the centre of the channel 1a is the point 2c at which the channel axis 2a and the second axis 2b intersect); and then moving the optical device 5 so that it is aligned above said point which on the channel axis 2a, and is equal distance between the start 1b and the end 1c of the channel. For such embodiments the cartridge 1 must have at least the first and second elements 3,4.

In this example the optical device 5 will be moved using the carriage 9. Typically the carriage 9 will have a stepper motor, so the optical device 5 will be moved, step-wise, from the starting position, over the cartridge 1 and over said first and second elements 3,4 on the cartridge. The movement of the optical device 5, from the starting position, over the cartridge 1 and over said first and second elements 3,4 on the cartridge, may be stopped at any point after the optical device has passed over the first and second elements 3,4. Typically the starting position will be a predefined location on the cartridge 1, wherein the first and second elements 3,4 will be located between the starting position and the channel 1a; so when the optical device 5 is moved, it will be moved, from the starting position in the direction of the channel 1a so that it passes over the first and second elements 3,4 which are located between the starting position and the channel 1a. It should be noted that the optical device 5 is most preferably moved linearly from the starting position, over the first and second elements 3,4, in the direction of the channel 1a.

In one example the optical device 5 may be further moved to also pass over the channel 1a. In this case the channel 1a will typically manipulate light which it receives from the optical device, so that output signal which represents light detected by the sensor at each position of the optical device 5 will also indicate at what position the optical device was aligned over the channel 1a. However, since the channel 1a typically has such small dimensions, it is easy to mistake the change in the output signal of the sensor when the optical device 5 is aligned over the channel 1a, for noise.

As mentioned the cartridge 1 of the present invention is not limited to requiring both a first and second element 3,4; on the contrary in another embodiment the cartridge 1 may comprise only the first element 3 (i.e. no second element 4); in this case alignment of the optical device 5 over above a point (any point) which is on the channel axis 2a, between the start 1b and the end 1c of the channel 1a, can be achieved (i.e. the optical device will be positioned somewhere along the channel axis 2a; but may not necessarily be aligned the point 2c which is equal distance between the start 1b and the end 1c of the channel 1a). Provided that the first element 3 extends along an axis which is parallel to the channel axis 2a, and provided the length which the first element 3 extends along said axis is not greater than the length 'L' which the channel 1a extends long the channel axis 2a, then, using the present invention, the optical device 5 can be successfully positioned above a point (any point) which is on the channel axis 2a, somewhere between the start 1b and the end 1c of the channel 1a. The cartridge is only required to have a second element 4 in order to be able to consistently align the optical device 5 over said point 2c which on the channel axis 2a, and is equal distance between the start 1b and the end 1c of the channel.

Figure 3:
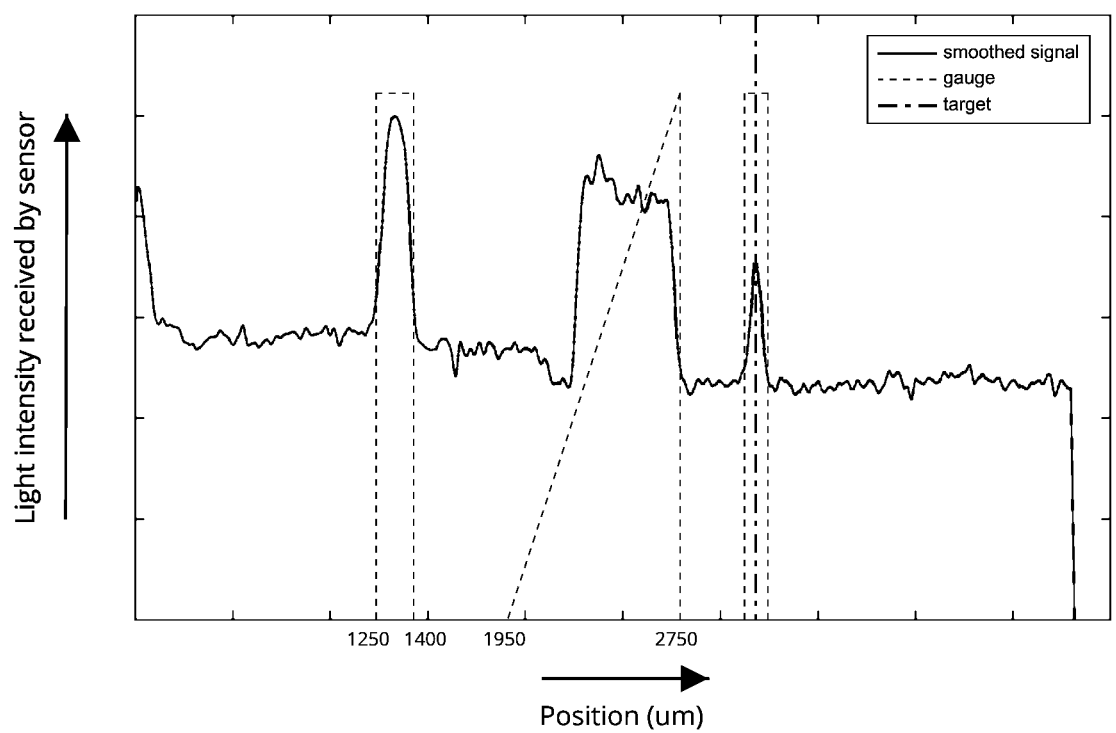
FIG. 3 is an example of an output signal provided by the sensor in the assembly of FIG. 2 when the optical device is passed over the first and second elements of the cartridge.

FIG. 3 provides an example of an output signal which is provided by the sensor 12 when the optical device 5 has been moved from the starting position, over the cartridge 1 and over said first and second elements 3,4 on the cartridge 1. The output signal represents light detected by the sensor 12 (e.g. the output signal represents the intensity of light received by the sensor 12) at each position of the optical device 5. As shown in FIG. 3 recorded position of the optical device 5 is shown on the x-axis; and at each position for the optical device 5, the output signal represents light detected by the sensor 12 (e.g. the output signal represents the intensity of light received by the sensor 12) when the optical device 5 was located at that position.

Since the first and second elements 3,4 are configured to manipulate light by reflection of light, it can be expected that when the output signal will show some changes when the optical device 5 was positioned over these elements 3,4, compared to the output signal when the optical device 5 was position over other parts of the cartridge 1 (it should be noted that the other parts of the cartridge 1 are not configured to manipulate light in the same manner as the first and second elements 3,4). In this example the first and second elements 3,4 are configured to reflect light, when the optical device is positioned over the first and/or second elements 3,4 it can be expected that the level of light (e.g. the intensity of light) which the sensor 12 receives will increase (or for an element 3,4 which is designed to absorb light, it can be expected that the level of light (e.g. the intensity of light) which the sensor 12 receives will decrease). Thus, the position(s) along the x-axis, at which output signal show increased levels of light (e.g. increase in the intensity of light) received by the sensor 12, correspond to the position(s) at which the optical device 5 was aligned over the first and second 3,4 elements. Since the starting position is known, and the direction which the optical device was moved across the cartridge towards the cartridge is known (i.e. linear direction; the optical device is preferably moved linearly from the starting position, over the first and second elements 3,4, in the direction of the channel 1), it can be determined which of the elements 3,4, the optical device passed over the first. In this example the optical device 5 was moved from the starting position, in a direction towards of the channel 1a, over the first element 3 first, and then over the second element 4. Thus, as can be seen in the output signal of FIG. 3, the first increase in the output signal which occurs between 1250 µm-1400 µm (i.e. between 1250 µm-1400 µm from the starting position), corresponds to when the optical device 5 was aligned over the first element 3; and the next increase in the output signal which occurs between 1950 µm-2750 µm (i.e. between 1950 µm-2750 µm from the starting position) corresponds to when the optical device 5 was aligned over the second element 4.

Since the first element 3 is at a predefined distance from the channel 1a, and the position (i.e. between 1250 mm-1400 mm from the starting position) at which the optical device 5 is aligned over the first element 3 can be determined from the output signal, these aspects can be used to determine how to move the optical device 5 so that it is aligned above a point (any point) which is on the channel axis 2a, and which is between the start 1b and the end 1c of the channel 1a.

For example, in a first embodiment the optical device 5 is moved back to an interim position, wherein the interim position is any position which is before the said determined position. Most preferably the interim position is the starting position; however the interim position could be any other position which is located before the said determined position (in the direction of movement from the stating position to the determined position); for example the interim position could alternatively be a position which is between the starting position and the determined position. Most preferably the interim position is a position which lies on an axis which intersects both the starting position and said determined position. Then the optical device is moved from the interim position (preferably starting position) to the position corresponding to said determined position (i.e. the position determined from the output signal, at which the optical device 5 was aligned over the first element 3; which in this example shown in FIG. 3, is, either, 1250 µm from the starting position (if the predefined position of the first element 3 relative to the channel 1a, is measured from a first side 3a of the first element (the first side 3a being a side of the first element 3 over which the optical device first passes)); or, 1400 µm from the starting position (if the predefined position of the first element 3 relative to the channel 1a, is measured from a second side 3b of the first element 3 (the second side 3b being a side of the first element immediately before it has completed passing over the first element 3)). Then said optical device 5 is moved from said determined position, a distance corresponding to the predefined distance which the first element 3 is from the channel 1a, so that the optical device is aligned above a point (any point) which is on the channel axis 2a, and which is between the start 1b and the end 1c of the channel 1a.

In a second embodiment, for example the optical device 5 is moved from its current position to the position corresponding to said determined position (i.e. the position determined from the output signal, at which the optical device 5 was aligned over the first element 3; which in this example shown in FIG. 3, is, either, 1250 μm from the starting position (if the predefined position of the first element 3 relative to the channel 1a, is measured from a first side 3a of the first element (the first side 3a being a side of the first element 3 over which the optical device first passes)); or, 1400 μm from the starting position (if the predefined position of the first element 3 relative to the channel 1a, is measured from a second side 3b of the first element 3 (the second side 3b being a side of the first element immediately before it has completed passing over the first element 3)); then said optical device 5 is moved from said determined position, a distance corresponding to the predefined distance which the first element 3 is from the channel 1a, so that the optical device is aligned above a point (any point) which is on the channel axis 2a, and which is between the start 1b and the end 1c of the channel 1a.

In a third embodiment the distance from the current position which the optical device 5 occupies, to the said determined position (i.e. the position determined from the output signal, at which the optical device 5 was aligned over the first element 3; which in this example shown in FIG. 3, is, either, 1250 μm from the starting position (if the predefined position of the first element 3 relative to the channel 1a, is measured from a first side 3a of the first element (the first side 3a being a side of the first element 3 over which the optical device first passes)); or, 1400 μm from the starting position (if the predefined position of the first element 3 relative to the channel 1a, is measured from a second side 3b of the first element 3 (the second side 3b being a side of the first element immediately before it has completed passing over the first element 3)), is determined. Then the said determined distance is subtracted from the predefined distance which the first element 3 is from the channel 1a, to provide a distance value; and then said optical device 5 is moved from said current position, a distance corresponding to the distance value, so that the optical device is aligned above a point (any point) which is on the channel axis 2a, and which is between the start 1b and the end 1c of the channel 1a.

It should be noted that in the afore mentioned, first, second and third embodiments the cartridge 1 is not required to have a second element 4 in order to align the optical device 5 above a point (any point) which is on the channel axis 2a, and which is between the start 1b and the end 1c of the channel 1a; only the first element 3 is necessary to implement these embodiments. As will be subsequently described, further additional steps may be carried out, which require that the cartridge 1 have the 15 second element 4, in order to further align the optical device 5 above a point 2c which is equal distance between the start 1b and the end 1c of the channel 1a. Thus using both the first and second elements the optical device 5 can be aligned above a point 2c which is on the channel axis 2a, and is equal distance between the start 1b and the end 1c of the channel 1a.

It should be understood that determining how to move the optical device 5 so that it is aligned above a point 2c which is equal distance between the start 1b and the end 1c of the channel 1a can be carried out a plurality of different ways, as will be described in more detail below.

With regards to the part of the output signal which corresponds to when the optical device 5 was aligned over the second element 4 (i.e. between 1950 μm-2750 μm from the starting position), this can be used to determine how to move the optical device 5 along the channel axis 2a so that it is aligned above a point 2c which is equal distance between the start 1b and the end 1c of the channel 1a. Thus the first element 3 is used to determine how to move the optical device 5 so that it is on the channel axis 2a, and the second element 4 is used to determine how to move the optical device along the channel axis 2a so that the optical device 5 is aligned above a point 2c, which is equal distance between the start 1b and the end 1c of the channel 1a.

The part of the output signal which corresponds to when the optical device 5 was aligned over the second element 4 is used to determine the length of the triangular-shaped surface 4a of the second element 4 over which the optical device 5 passed; in this example at position 1950 μm the optical device 5 began to pass over the second element (i.e. the optical device 5 was aligned above the second side 4c of the second element 4); at position 2750 μm the optical device 5 was aligned above the first side 4b of the second element 4 (i.e. immediately before the optical device 5 had passed over the second element completely); therefore the length of the triangular-shaped surface 4a of second element 5 over which the optical device 5 passed was '800 μm' (i.e. 2750 μm-1950 μm). Since the first side 4b of the triangular-prism-shaped second element 4 is parallel to the channel axis 2a; and the second side 4c of the of the triangular-prism-shaped second element 4 forms a predefined angle "x" with the first side 4b; and since directly opposite to the start 1b of the channel 1a, the distance, along an axis parallel to the second axis 2b, between the first side 4b and the second side 4c, is known; and, directly opposite to the end 1c of the channel 1a, the distance, along an axis parallel to the second axis 2b, between the first side 4b and the second side 4c, is known; and given that the optical device was moved linearly from the starting position towards the channel; using the length of the triangular-shaped surface 4a of second element 4 over which the optical device passed (i.e. 800 μm—which has been determined from the output signal) it can be determined how to move the optical device 5, along the channel axis 2a, in order to align the optical device 5 above the point 2c which is equal distance between the start 1b and the end 1c of the channel 1a. Then the optical device 5 is moved, along the channel axis 2a, to align the optical device 5 above the point 2c which is equal distance between the start 1b and the end 1c of the channel 1a.

In a further embodiment a predefined scaling factor is provided, wherein the scaling factor is a multiple which will convert the width of the portion of the output signal which corresponds to when the optical device was passing over the second element 4, to the physical length of the triangular-shaped surface 4a of second element 4. For example, considering the output signal shown in FIG. 3, the width of the portion of the output signal between 1950 μm on the x-axis and 2750 μm on the x-axis is measured; then this measured width is multiplied by the predefined scaling factor to obtain the length of the triangular-shaped surface 4a of second element 4 over which the optical device 5 passed. Since the first side 4b of the triangular-prism-shaped second element 4 is parallel to the channel axis 2a; and the second side 4c of the of the triangular-prism-shaped second element 4 forms a predefined angle "x" with the first side 4b; and since directly opposite to the start 1b of the channel 1a, the distance, along an axis parallel to the second axis 2b, between the first side 4b and the second side 4c, is known; and, directly opposite to the end 1c of the channel 1a, the distance, along an axis parallel to the second axis 2b, between the first side 4b and the second side 4c, is known;

and given that the optical device was moved linearly from the starting position towards the channel; using the length of the triangular-shaped surface 4a of second element 4 over which the optical device passed (which has been determined by multiplying the measured width by the predefined scaling factor) it can be determined how to move the optical device 5, along the channel axis 2a, in order to align the optical device 5 above the point 2c which is equal distance between the start 1b and the end 1c of the channel 1a. Then the optical device 5 is moved, along the channel axis 2a, to align the optical device 5 above the point 2c which is equal distance between the start 1b and the end 1c of the channel 1a.

Typically, the scaling factor is determined in a calibration step, whereby the optical device 5 is passed over various, known, lengths of the triangular-shaped surface 4a, to obtain various output signals which have corresponding output signals with various widths; the mathematical relationship between the widths of the signal and the physical length of the triangular-shaped surface 4a can be determined. The inverse of this mathematical relationship can then be defined using the scaling factor, which can be multiplied by the width of an output signal obtained when the optical device 5 passes over the triangular-shaped surface 4a of second element 4, to provide the physical length of the triangular-shaped surface 4a.

In a further embodiment the method comprises determining the scaling factor based on the part of the output signal which is output from the sensor when the optical device 5 was over the first element 3. In this embodiment the length of the surface 3c over which the optical device passes is predefined (e.g. the distance between the first side 3a and second side 3b of the first element 3 is predefined (assuming the optical device will be moved over the surface 3c of the first element in a direction which is perpendicular to the channel axis 2a); in other words the distance between the first side 3a and second side 3b of the first element 3 is a priori known). The scaling factor may then be determined by measuring a width of the first part of the output signal which is output from the optical device when the optical device is positioned over the first element; so in the example shown in FIG. 3 this would be done by measuring the width of the output signal which is between positions 1250 μm on the x-axis and the 1400 μm on the x-axis. And then dividing said predefined length of the surface 3c over which the optical device passes by the measured width (i.e. dividing the distance between the first side 3a and second side 3b of the first element 3, by the measured width to provide the scaling factor). Thus the scaling factor is simply a multiple by which the width of parts of the output signal corresponding to when the optical device was positioned over the element, of can be multiplied so as to obtain physical dimension of the element. This scaling factor can then be used to determine, from the width of the optical signal which is output by the sensor when the optical device 5 is positioned over the second element 4, the length of the surface 4a of the second element 4 over which the optical device 5 passed; so in the example shown in FIG. 3 this would be done by measuring the width of the output signal which is between positions 1950 μm on the x-axis and the 2750 μm on the x-axis, and then multiplying that width by the afore-mentioned scaling factor (which was determined from the first element 3) to provide the length of the surface 4a of the second element 4 over which the optical device 5 passed.

In a further embodiment a predefined part of the second element 4 is aligned with the start 1b of the channel, and wherein said predefined part of the second element has a predefined length of surface 4a between the first and second sides 4b,4c (This can be done, for example, by simply in a calibration step which comprise measuring the length of surface 4a between the first and second sides 4b,4c of the second element 4 at a position which is directly opposite the start 1b of the channel 1). The channel 1a has a predefined length 'L' (the predefined length 'L' of the channel may be determined in a calibration step for example, wherein the length of the channel 1a between the start 1b and end 1c is measured). The distance between the part of the triangular-shaped surface 4a over which the optical device 5 passed, and the predefined part of the second element 4 which is aligned with the start 1b of the channel 1a is determined; and based on said determined distance and the predefined length 'L' of the channel, determine how to move the optical device 5 along the channel axis 2a so that it is aligned above the point 2c which is equal distance between the start 1b and the end 1c of the channel 1a.

In a further embodiment the first and second elements 3,4 are a predefined distance apart on the cartridge 1; this predefined distance is used to identify which increase in the output signal is caused by the first element 3 and which increase in the output signal is caused by the second element 4. Thus this embodiment further comprises, identifying sections of the output signal which contain signals which are representative of manipulation of light, which are a distance (along the x-axis) apart which corresponds to the distance between the first and second elements on the cartridge. For example, referring to the output signal in FIG. 3, it is known that the distance between the second side 3b of the first element 3 and the first side 4b of the second element 4 on the cartridge is 1350 μm; accordingly, referring to FIG. 3, it can be determined that the increase in the output signal which trails the position 2750 μm (on the x-axis) is due to the second element 4; and any increase in the output signal which occurs between position 1400 μm (on the x-axis) and the increase in the output signal which trails the position 2750 μm (on the x-axis) is noise. Thus, knowing the distance between the first and second elements 3,4 on the cartridge 1, facilitates a user enables a user to more reliably identify increases in the output signal due to the first and second elements 3,4; and thus also allows to more reliably identify increases in the output signal due to noise.

It should be noted that in the above description, the length of the surface of over which the optical device moves, is the distance over said surface over which the optical device moves. So, for example, the length of the surface 3c (rectangular-shaped surface 3c) of the first element 3 over which the optical device moves is the distance over said surface 3c (rectangular-shaped surface 3c) over which the optical device moves; likewise, the length of the surface 4a (triangular-shaped surface 4a) over which the optical device moves is the distance over said surface 4a (triangular-shaped surface 4a) over which the optical device moves.

It should be noted that the method of present invention may further comprise the step of processing the output signal. In such a case, preferably the processed output signal (not the original output signal) is then used when performing the above-mentioned methods of the present invention. Processing the output signal may comprise one or more steps:

For example, processing the output signal may comprise, linearizing the output signal; and/or filtering the output signal. For example the step of filtering said output signal, may comprise smoothing said linearized signal using a finite impulse response filter.

For example, processing the output signal may comprise, adding data points to said output signal at points corresponding to positions where the sensor 12 failed to record the light which it received from said cartridge 1 and/or elements 3,4. In one embodiment said value of each data point is determined by interpolation of two data points on either side of said respective point corresponding to the respective position where the sensor failed to record the light which it received from said cartridge 1 and/or elements 3,4.

For example, processing the output signal may comprise, defining a gauge which represents an ideal shape of the output signal which is output from said sensor 12 when the optical device 5 passes over an element 3,4; and then identifying the portion of the output signal which best fits to that gauge as corresponding to when the optical device 5 was positioned over the corresponding element 3,4. Most preferably processing the output signal comprises, defining a gauge for each respective element on the cartridge, which represents an ideal shape of the output signal which is output from said sensor 12 when the optical device 5 passes over that element; and then, for each gauge, identifying the portion of the output signal which best fits to that gauge as corresponding to when the optical device 5 was positioned over the corresponding element 3,4. It should be noted that that the step of identifying the portion of the output signal which best fits to that gauge, may comprise comparing the gauge with successive portions of the output signal, and identifying the portion of the output signal which best fits the gauge. The comparison between the gauge and the successive portions of the output signal may be carried out using auto-correlation or convolution.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment

The invention claimed is:

1. An assembly for testing a sample fluid to determine a sample property, the assembly comprising,
   a cartridge comprising, an elongated channel along which a sample fluid can flow wherein the elongated channel is defined by a groove in the cartridge, one or more elements which are configured to manipulate light in a predefined manner, and wherein said one or more elements are located in a predefined position relative to the elongated channel so that the one or more elements can facilitate alignment of an optical device with the elongated channel;
   an optical device which is configured such that the optical device can be selectively operated to emit light;
   a means for moving the optical device with respect to the cartridge, which can move the optical device from a first position in which optical device is not aligned with the elongated channel, over the one or more elements, to a second position in which the optical device is aligned with the elongated channel so that light emitted by the optical device can be incident on sample fluid flowing in the channel to test the sample fluid;
   a sensor which is configured to output a signal which is representative of the light which the sensor received, wherein said sensor receives light which has been reflected by the cartridge when the optical device is in said first position, and wherein the sensor receives light which has been manipulated by the one or more elements as the optical device is moved over the one or more elements, and wherein said received manipulated light causes a predefined change in the output of the sensor so that the output of the sensor can be used to determine the position of the optical device relative to the elongated channel.

2. An assembly according to claim 1 wherein said sensor comprises a photodiode.

3. An assembly according to claim 1 wherein the sample property which is determined is an intrinsic property of the sample fluid.

4. An assembly according to claim 1 wherein the sample property which is determined is a property of the sample fluid which exists regardless of an amount of the sample fluid.

5. An assembly according to claim 1 wherein the means for moving the optical device with respect to the cartridge is configured to move the optical device a predefined amount and direction in response to a predefined change in the output of the sensor occurring, wherein said predefined amount and direction corresponds to said predefined position of said one or more elements relative to the elongated channel, and wherein said predefined change in the output of the sensor is a change in the output of the sensor that indicates that the optical device has been moved over the one or more elements.

6. An assembly according to claim 1 wherein the output of said sensor can be used to indicate if the optical device is aligned with the channel.

7. A method of arranging an optical device into a predefined position with respect to a cartridge, using an assembly which comprises, a cartridge comprising, a channel along which a sample fluid can flow, one or more elements which are configured to manipulate light in a predefined manner, and wherein said one or more elements are located in a predefined position relative to the channel; an optical device which is configured such that the optical device can be selectively operated to emit light which is incident on the cartridge; a means for moving the optical device with respect to the cartridge, or a means for moving said cartridge with respect to the optical device; a sensor which can receive light from said cartridge, said light having been emitted by said optical device, and wherein the sensor is configured to output a signal which is representative of the light which the sensor received, the method comprising the steps of,
   operating the optical device to emit light which is incident on the cartridge;
   moving the optical device, from a starting position, over the cartridge and over one of said one or more elements on the cartridge;
   as the optical device is moved from said starting position, over the cartridge and over an element on the cartridge, recording the position of the optical device relative to the starting position;
   at each position for the optical device, detecting light using said sensor and outputting from the sensor a signal which represents light detected by the sensor, so as to provide an output signal which represents light detected by the sensor at each position of the optical device;
   determining, from said output signal, the position at which the optical device was aligned over one of said one or more elements;
   using said determined position and the predefined position of the element relative to the channel, to determine how to move the optical device so that the optical device is aligned above the channel;
   moving the optical device so that the optical device is aligned above the channel.

8. A method according to claim 7 wherein the method comprises using said determined position and the predefined position of the element relative to the channel to determine how to move the optical device so that the optical device is aligned above a point on a channel axis, between a start and the end of the channel; and moving the optical device so that the optical device is aligned above a point on the channel axis, between the start and the end of the channel.

9. The method according to claim 8 wherein the method comprises using said determined position and the predefined position of the element relative to the channel to determine how to move the optical device so that the optical device is aligned above a point which is both, on a channel axis, and is equal distance between the start and the end of the channel; and moving optical device so that the optical device is aligned above said point.

10. A method according to claim 7, wherein the step of moving the optical device so that the optical device is aligned above the channel comprises,
moving said optical device back to a interim position which is before the determined position;
moving said optical device from said interim position to the position corresponding to said determined position;
moving said optical device from said determined position, a distance corresponding to the predefined distance which the element is from a centre of the channel, so that the optical device so that the optical device is aligned above the channel.

11. A method according to claim 10 wherein said interim position is said starting position.

12. A method according to claim 7, wherein the step of moving the optical device so that the optical device is aligned above the channel comprises,
moving said optical device from its current position to the position corresponding to said determined position;
moving said optical device from said determined position, a distance corresponding to the predefined distance which the element is from a centre of the channel, so that the optical device so that the optical device is aligned above the channel.

13. A method according to claim 7, wherein the steps of using said determined position and the predefined position of the element relative to the channel, to determine how to move the optical device so that the optical device is aligned above a centre of the channel, and then moving the optical device so that the optical device is aligned above the channel, comprises,
determining the distance from a current position of the said optical device to said determined position;
subtracting said determined distance from the predefined distance which the element is from a centre of the channel, to provide a distance value;
moving said optical device from said current position, a distance corresponding to the distance value, so that the optical device so that the optical device is aligned above the centre of the channel.

14. A method according to claim 7 wherein the cartridge of the assembly comprises a first element which is a predefined distance from the channel, wherein the method comprises the steps of,
operating the optical device to emit light which is incident on the cartridge;
moving the optical device, from a starting position, over the cartridge and over said first element on the cartridge;
as the optical device is moved from said starting position, over the cartridge and over the first element on the cartridge, recording the position of the optical device relative to the starting position;
at each position for the optical device, detecting light using said sensor and outputting from the sensor a signal which represents light detected by the sensor, so as to provide an output signal which represents light detected by the sensor at each position of the optical device;
identifying a first part of the output signal which was output from the sensor, wherein said first part of the output signal is a part of the output signal which was output from the sensor when the optical device was at a position at which the optical device was positioned over said first element;
determining, from said identified first part of the output signal, the position at which the optical device was aligned over said first element;
using said determined position and the predefined position of the element relative to the channel, to determine how to move the optical device so that the optical device is aligned above an axis of the channel;
moving the optical device so that the optical device is aligned above the axis of the channel.

15. A method according to claim 14, wherein the cartridge of the assembly further comprises a second element which comprises a triangular surface, and wherein the method further comprises the steps of,
moving the optical device over the second element on the cartridge;
as the optical device is moved over the second element on the cartridge, recording the position of the optical device relative to the starting position;
identifying a second part of the output signal, wherein said second part of the output signal is a part of the output signal which was output from the sensor when the optical device was at a position at which the optical device was positioned over said second element;
determining, from said identified second part of the output signal, the length of the surface of the second element over which the optical device passed;
using said determined length of the surface to determine how to move the optical device so that the optical device is aligned above a point which is equal distance between a start of the channel and an end of the channel;
moving the optical device so that the optical device is aligned above said point.

16. A method according to claim 15 wherein the first and second elements are predefined distance apart on the cartridge, and wherein the method comprises the steps of, identifying the first and second parts of the output signal based on said predefined distance, by identifying two sections of the output signal which are representative of manipulation of light, which are a distance apart which corresponds to the distance equal to said predefined distance between the first and second elements on the cartridge.

17. A method according to claim 15, wherein the step of determining, from said identified second part of the output signal, the length of the surface of the second element over which the optical device passed comprises,
measuring the width of the second part of the output signal; and
multiplying the measured width by a scaling factor, wherein the scaling factor is a multiple which defines the mathematical relationship between the width of a part of the output signal, and the length of a surface of the second element over which the optical device passed.

18. A method according to claim 17, wherein the first element comprises a surface, having a predefined length, over which the optical device moves; and wherein the method further comprises the step of determining said scaling factor, by
measuring the width of the first part of the output signal;
dividing the predefined length by the measured width to obtain the scaling factor.

19. A method according to claim 14, wherein the length of the channel is predefined, and wherein a distance between a first side and a second side of the second element, where the second side directly opposite a start position of the channel, is predefined, and wherein the first side forms an predefined angle with the second side of the second element, and wherein the step of using said determined length of the surface to determine how to move the optical device so that the optical device is aligned above a point which is equal distance between a start position of the channel and an end position of the channel, comprises,
using said determined length of the surface, and said predefined angle to determine which part of the second element the optical device passed over;
using the said predefined distance between a first side and a second side of the second element, directly opposite the start position of the channel is predefined, to determine the distance the optical device is from the start position of the channel;
using the predefined length of the channel and the determined distance the optical device is from the start position of the channel to determine how to far to move the optical device to said point which is equal distance between a start position of the channel and an end position of the channel.

20. A method according to claim 7, wherein the method further comprises processing the output signal.

21. A method according to claim 20 wherein the step of processing the output signal comprises,
linearizing the output signal;
and filtering the output signal.

22. A method according to claim 21, wherein said output signal which is output from the sensor comprises a series of data points, and wherein the step of linearizing the output signal, comprises, adding data points to said output signal at points corresponding to positions where the sensor failed to output an output signal, wherein said value of said data points is determined by interpolation of two data points on either side of said respective point corresponding to the respective position where the sensor failed to output an output signal.

23. A method according to claim 20, wherein the step of filtering said output signal, comprises smoothing said linearized signal using a finite impulse response filter.

24. A method according to claim 20, wherein said step of processing the output signal further, comprises,
defining a gauge which represents an ideal shape of the signal which is output from said sensor when the optical device passes over said one or more elements;
identifying the portion of the signal which best fits to the gauge as corresponding to when the optical device was positioned over the one or more elements.

* * * * *